(12) United States Patent
Kaneko et al.

(10) Patent No.: US 9,008,950 B2
(45) Date of Patent: Apr. 14, 2015

(54) PRESSURE SENSOR DIAGNOSING METHOD AND COMMON RAIL FUEL INJECTION CONTROL APPARATUS

(71) Applicant: Bosch Corporation, Tokyo (JP)

(72) Inventors: Hirotaka Kaneko, Saitama (JP); Kota Hashimoto, Saitama (JP)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 13/626,227

(22) Filed: Sep. 25, 2012

(65) Prior Publication Data

US 2013/0080032 A1 Mar. 28, 2013

(30) Foreign Application Priority Data

Sep. 28, 2011 (JP) ................. 2011-212521

(51) Int. Cl.

| | | |
|---|---|---|
| B60T 7/12 | (2006.01) | |
| G05D 1/00 | (2006.01) | |
| G06F 7/00 | (2006.01) | |
| G06F 17/00 | (2006.01) | |
| G06F 19/00 | (2011.01) | |
| G06G 7/70 | (2006.01) | |
| G01L 19/00 | (2006.01) | |
| G01L 27/00 | (2006.01) | |
| F02D 41/38 | (2006.01) | |
| F02D 41/22 | (2006.01) | |

(52) U.S. Cl.
CPC ......... *G01L 19/0092* (2013.01); *F02D 41/3836* (2013.01); *F02D 2041/223* (2013.01); *F02D 2200/0604* (2013.01); *F02D 2200/0608* (2013.01); *G01L 27/007* (2013.01)

(58) Field of Classification Search
CPC .......... F02D 41/222; F02D 2200/0602; F02D 35/023; F02D 2200/0606; F02M 63/0225
USPC ............... 73/114.41, 114.42, 114.43, 114.48, 73/114.51; 123/446, 447, 456, 457, 495, 123/506, 510, 511, 512, 513; 701/101, 102, 701/107, 114
See application file for complete search history.

(56) References Cited

U.S. PATENT DOCUMENTS

| | | | | |
|---|---|---|---|---|
| 7,028,467 | B2 * | 4/2006 | Kuboshima et al. ............ | 60/297 |
| 2007/0079808 | A1 * | 4/2007 | Takahashi ...................... | 123/447 |
| 2007/0101973 | A1 * | 5/2007 | Wolber et al. ................. | 123/464 |
| 2008/0209990 | A1 * | 9/2008 | Hanari et al. ............... | 73/114.38 |
| 2011/0160981 | A1 * | 6/2011 | Rieger et al. .................. | 701/103 |

FOREIGN PATENT DOCUMENTS

| | | |
|---|---|---|
| JP | 2006329033 A | 12/2006 |
| JP | 2007242332 A | 9/2007 |

* cited by examiner

*Primary Examiner* — Mahmoud Gimie
*Assistant Examiner* — Sizo Vilakazi
(74) *Attorney, Agent, or Firm* — Michael Best & Friedrich LLP

(57) ABSTRACT

Disclosed is a common rail fuel injection control apparatus that is used in an engine that drives power equipment, an actual measurement temperature difference that is a difference between a pre-pressurization temperature of the fuel and a post-pressurization release temperature of the fuel is obtained, and it is determined that a pressure sensor is failed when an absolute value of a difference between a representative temperature difference set in advance as a difference between the pre-pressurization temperature of the fuel and the post-pressurization release temperature of the fuel, and the actual measurement temperature difference exceeds a predetermined threshold value.

4 Claims, 4 Drawing Sheets

PRESSURE SENSOR DIAGNOSING METHOD AND COMMON RAIL FUEL INJECTION CONTROL APPARATUS

BACKGROUND OF THE INVENTION

The present invention relates to a pressure sensor diagnosing method that detects the rail pressure in a common rail fuel injection control apparatus, and a common rail fuel injection control apparatus using the same, and in particular, to a pressure sensor diagnosing method and a common rail fuel injection control apparatus capable of detecting a failure of a pressure sensor with a simple configuration and at low cost.

In a so-called common rail fuel injection control apparatus, a pressure sensor is an essential component for detecting an actual rail pressure needed for rail pressure control. Since a failure of the pressure sensor has a major effect on rail pressure control, various diagnosing methods, apparatuses, and the like have been proposed and put into practical use in the related art.

For example, a method referred to as a so-called offset test has been proposed, in which obtains a detection signal of a pressure sensor when it is determined that the fuel pressure of a common rail has been reduced to atmospheric pressure, calculates the fuel pressure corresponding to the detected signal, and determines that the pressure sensor has failed when a difference between the calculated fuel pressure and atmospheric pressure is a predetermined value or more (See, for example, pages 3 to 6 and FIGS. 1 and 2 in JP-A-2007-242332).

Further, other than the offset test, various methods, apparatuses, and the like, which diagnose whether or not a gradient of the pressure sensor is normal, have been proposed and put into practical use.

For example, as a method adopting a configuration in which an electromagnetic type safety valve is provided in the common rail, there is a method that learns an operation characteristic of the electromagnetic type safety valve through a so-called learning process, and determines that the pressure sensor is failed if the range of the learnt value exceeds a predetermined range.

However, in the method disclosed in JP-A-2007-242332, it is possible to perform general diagnosis of whether or not the output of the pressure sensor is normal under atmospheric pressure, but it is not possible to diagnose whether or not the gradient of an output characteristic of the pressure sensor is normal under atmospheric pressure. Therefore, there is a problem in that the method is not able to respond to the demand for diagnosing the gradient of the output characteristic of the pressure sensor.

On the other hand, in the method that learns an operation characteristic of the electromagnetic type safety valve through a so-called learning process and determines that the pressure sensor is failed if a range of the learnt value exceeds a predetermined range, it is assumed that a configuration equipped with an electromagnetic safety valve is adopted. However, an electromagnetic type necessarily should be used as the safety valve. Since there are cases where a mechanical safety valve is used, or cases where a configuration not equipped with a safety valve itself is used, there is a problem in that this method lacks generality as a diagnosing method.

SUMMARY OF THE INVENTION

The present invention has been made in view of the above-mentioned points, and provides a pressure sensor diagnosing method and a common rail fuel injection control apparatus capable of diagnosing a failure of a pressure sensor with simple configuration regardless of the presence or absence of a safety valve.

In order to attain the above-mentioned object of the present invention, a pressure sensor diagnosing method of a common rail fuel injection control apparatus according to a first aspect of the present invention, in which fuel in a fuel tank is pressurized and pressure-fed into a common rail by a high pressure pump, high pressure fuel is injected into an internal combustion engine through an injector connected to the common rail, and a pressure of the common rail is controlled based on a detection signal of a pressure sensor that detects the pressure of the common rail, the pressure sensor diagnosing method includes:

obtaining an actual measurement temperature difference which is a difference between a pre-pressurization temperature of the fuel and a post-pressurization release temperature of the fuel; and determining that the pressure sensor has failed when the absolute value of a difference between a representative temperature difference and the actual measurement temperature difference exceeds a predetermined threshold value, the representative temperature difference being set in advance as a difference between a pre-pressurization temperature of the fuel and a post-pressurization release temperature of the fuel.

Further, in order to attain the above-mentioned object of the present invention, a pressure sensor diagnosing method of a common rail fuel injection control apparatus according to a second aspect of the present invention in which fuel in a fuel tank is pressurized and pressure-fed into a common rail by a high pressure pump, high pressure fuel is injected into an internal combustion engine through an injector connected to the common rail, and a pressure of the common rail is controlled based on a detection signal of a pressure sensor that detects the pressure of the common rail, the pressure sensor diagnosing method includes:

obtaining an actual measurement temperature difference which is a difference between a pre-pressurization temperature of the fuel and a post-pressurization release temperature of the fuel, when a target rail pressure is changed;

calculating an estimated temperature difference using a predetermined calculation formula, the estimated temperature difference being a difference between a pre-pressurization temperature of the fuel and a post-pressurization release temperature of the fuel which is estimated to be obtained by a change in the target rail pressure; and determining that the pressure sensor is failed when an absolute value of a difference between the estimated temperature difference and the actual measurement temperature difference exceeds a predetermined threshold value.

Still further, in order to attain the above-mentioned object of the present invention, a common rail fuel injection control apparatus according to a third aspect of the present invention, in which fuel in a fuel tank is pressurized and pressure-fed into a common rail by a high pressure pump, high pressure fuel is injected into an internal combustion engine through an injector connected to the common rail, and a pressure of the common rail is controlled by an electrical controlling unit, based on a detection signal of a pressure sensor that detects the pressure of the common rail, wherein the electrical controlling unit is constructed to calculate an actual measurement temperature difference which is a difference between a pre-pressurization temperature of the fuel and a post-pressurization release temperature of the fuel, determine whether or not an absolute value of a difference between a representative temperature difference and the actual measurement temperature difference exceeds a predetermined threshold value, the representative temperature difference being set in advance as a difference between a pre-pressurization temperature of the fuel and a post-pressurization release temperature of the fuel, and determine that the pressure sensor is failed when the absolute value exceeds the predetermined threshold value.

Still further, in order to attain the above-mentioned object of the present invention, a common rail fuel injection control apparatus according to a fourth aspect of the present invention, in which fuel in a fuel tank is pressurized and pressure-fed into a common rail by a high pressure pump, high pressure fuel is injected into an internal combustion engine through an injector connected to the common rail, and a pressure of the common rail is controlled by an electrical controlling unit, based on a detection signal of a pressure sensor that detects the pressure of the common rail, wherein the electrical controlling unit is constructed to calculate an actual measurement temperature difference which is a difference between a pre-pressurization temperature of the fuel and a post-pressurization release temperature of the fuel when a target rail pressure of the common rail is changed, calculate an estimated temperature difference using a predetermined calculation formula, the estimated temperature difference being a difference between a pre-pressurization temperature of the fuel and a post-pressurization release temperature of the fuel which is estimated to be obtained by a change in the target rail pressure, determine whether an absolute value of a difference between the estimated temperature difference and the actual measurement temperature difference exceeds a predetermined threshold value, and determine that the pressure sensor is failed when the absolute value exceeds the predetermined threshold value.

DETAILED DESCRIPTION

Hereinafter, embodiments of the invention will be described referring to the accompanying FIGS. 1 to 4.

In addition, members, placements, and the like that will be described below are not intended to limit the present invention, but rather can be modified in a various way within the range of the spirit of the present invention.

Figure 1:
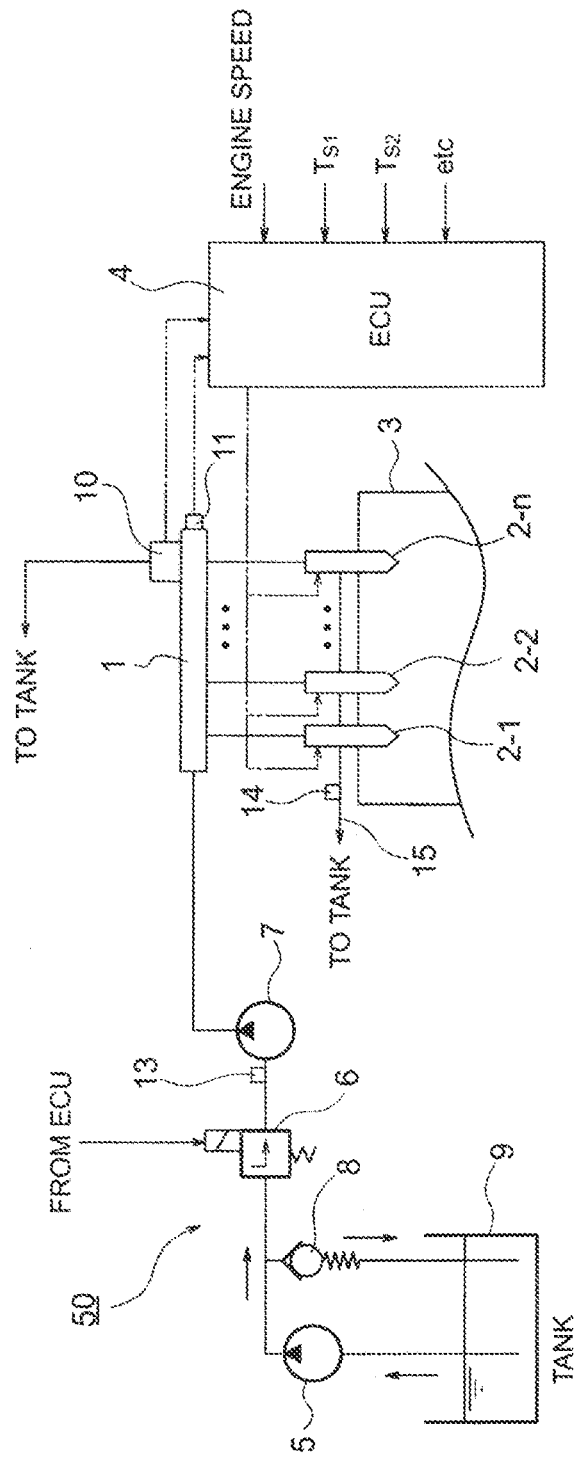
FIG. 1 is a configuration diagram illustrating a configuration example of a common rail fuel injection control apparatus to which a pressure sensor diagnosing method is applied in an embodiment of the invention.

First, a description will be made referring to FIG. 1 with respect to a configuration example of a common rail fuel injection control apparatus to which a pressure sensor diagnosing method is applied in an embodiment of the invention.

The common rail fuel injection control apparatus includes, as main components, a high pressure pump apparatus 50 that performs pressure-feed of high pressure fuel, a common rail 1 that accumulates the high pressure fuel pressure-fed by the high pressure pump apparatus 50, a plurality of fuel injection valves 2-1 to 2-$n$ that performs injection supply of the high pressure fuel supplied from the common rail 1, to a cylinder of an engine 3, and an electrical controlling unit (referred to as "ECU" in FIG. 1) 4 that performs fuel injection control process, pressure sensor diagnosing process that will be described below, and the like.

Such a configuration itself is the same as the basic configuration of this kind of fuel injection control apparatus that has been well-known from the past.

The common rail fuel injection control apparatus like this is also used in, for instance, generation facilities, other than being mounted in automobiles. That is, in automobiles, the engine 3 is an engine for vehicles, and in generation facilities, the engine 3 is used as a driving source for a generator (not shown).

The high pressure pump apparatus 50 has a publicly well-known configuration that includes a supply pump 5, a metering valve 6, and a high pressure pump 7 as main components.

In this configuration, the fuel in a fuel tank 9 is pumped up by the supply pump 5, and supplied to the high pressure pump 7 through the metering valve 6. Since an electromagnetic proportioning control valve is used for the metering valve 6, and electricity conduction amount is controlled by the electrical controlling unit 4, and the flow rate of supply fuel to the high pressure pump 7, in other words, the discharge amount from the high pressure pump 7 is adjusted.

In addition, a first temperature sensor 13 for detecting a temperature of fuel is provided in a suitable part on a fuel inlet side of the high pressure pump 7 so that the output thereof is input to the electrical controlling unit 4.

Further, a return valve 8 is provided between the output side of the supply pump 5, and the fuel tank 9 so that surplus fuel on the output side of the supply pump 5 can be returned to the fuel tank 9.

In addition, the supply pump 5 may be provided separately from the high pressure pump apparatus 50 on the upstream side of the high pressure pump apparatus 50, or may be provided inside the fuel tank 9.

The fuel injection valves 2-1 to 2-$n$ are provided in every cylinder of the engine 3 so as to respectively receive the high pressure fuel supply from the common rail 1 and perform fuel injection according to injection control by the electrical controlling unit 4.

In the embodiment of the present invention, a second temperature sensor 14 is provided in proper location in a return passage 15 to return the surplus fuel in the fuel injection valves 2-1 to 2-$n$ so that the temperature of the return fuel can be detected, and the output thereof is input to the electrical controlling unit 4.

In the common rail 1 in the embodiment of the present invention, a safety valve 10 is provided in a return passage (not shown) to return the surplus fuel to the tank 9. If the rail pressure inside the common rail 1 exceeds the predetermined pressure set in the safety valve 10, the safety valve 10 turns to an open valve state. In this case, fuel in the common rail 1 is discharged to the tank 9 through the return passage (not shown) on a low pressure side, and thus unintended increases in the rail pressure are limited.

In addition, the safety valve 10 is not an essential component in the common rail fuel injection control apparatus using the pressure sensor diagnosing method that will be described below, but rather the configuration of a common rail fuel injection control apparatus not equipped with the safety valve 10 may be adopted.

The electrical controlling unit 4 uses as a key component, a microcomputer (not shown) having a publicly well-known configuration, and has a memory device (not shown) such as a RAM or a ROM. In addition, the electrical controlling unit 4 includes, as main components, a driving circuit (not shown) for driving the fuel injection valves 2-1 to 2-n and an electricity conduction circuit (not shown) for conducting the metering valve 6.

A detection signal of the pressure sensor 11 for detecting a pressure of the common rail 1 is input to the electrical controlling unit 4, and also various detection signals such as an engine speed, a detection signal Ts1 of the first temperature sensor 13, a detection signal Ts2 of the second temperature sensor 14 are input to the electrical controlling unit 4 in order to be provided for operation control and fuel injection control of the engine 3, and further, for a pressure sensor diagnosing process that will be described below.

Also, when the common rail fuel injection control apparatus is used in automobiles other than the signals described in the above, as signals to be input, there are an accelerator pedal position, an atmospheric pressure, and so on.

Next, the sequence of a pressure sensor diagnosing process in an embodiment of the present invention performed by the electrical controlling unit 4 will be described referring to FIG. 2.

Figure 2:
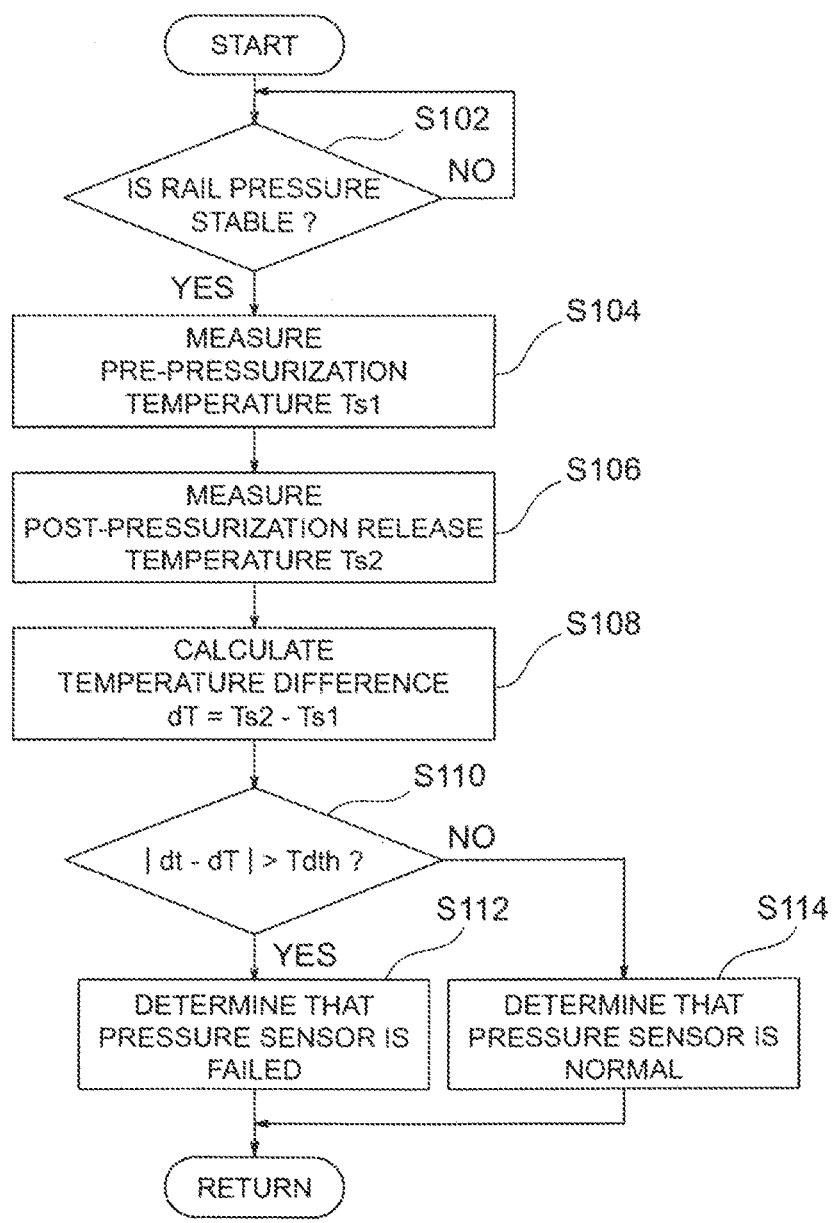
FIG. 2 is a subroutine flowchart illustrating a process sequence in a first configuration example of a pressure sensor diagnosing method in an embodiment of the invention.

The pressure sensor diagnosing process shown in FIG. 2 is suitable for a case where the common rail fuel injection control apparatus is used, for instance, in so-called an off-highway equipment such as a power facility other than an automobile.

If the process by the electrical controlling unit 4 is started, determination is performed firstly ether or not the rail pressure is stable (refer to step S102 in FIG. 2).

As judgment criteria that judges whether or not rail pressure is stable, there may be, for instance, the judgment criteria that judges whether or not a rail pressure remains for a predetermined time within a predetermined deviation range from a target rail pressure as a center. In this case, the predetermined deviation range and the predetermined time have to be set based on the result of a test, a simulation, and so on in view of actual various conditions for each apparatus.

In addition, it is not necessary to limit judgment criteria to the above judgment criteria, but rather more proper criteria may be set in view of actual various conditions for each apparatus.

Thus, if it is determined that the rail pressure is stable in step S102 (in a case of YES), measurement of pre-pressurization temperature Ts1 is performed (refer to step S104 in FIG. 2).

Here, the pre-pressurization temperature refers to the fuel temperature before fuel is high pressurized by the high pressure pump 7, and the pre-pressurization temperature is detected by the first temperature sensor 13 provided in the proper part on the fuel inlet side of the high pressure pump 7 in the embodiment of the present invention.

In step S104, the output signal of the first temperature sensor 13 is read in the electrical controlling unit 4 and is stored in a proper memory area thereof.

Next, measurement of post-pressurization release temperature Ts2 is performed (refer to step S106 in FIG. 2).

Here, the post-pressurization release temperature refers to the temperature of fuel to be returned to the fuel tank 9 after fuel is high pressurized by the high pressure pump 7. Specifically, as the post-pressurization release temperature, there is a temperature of fuel returned as surplus fuel from the common rail 1 through the safety valve 10, and the temperature of fuel returned as surplus fuel from the fuel injection valves 2-1 to 2-n. The post-pressurization release temperature Ts2 is detected by the second temperature sensor 14 provided in the proper location of the return passage 15 to return the surplus fuel of the fuel injection valves 2-1 to 2-n in the embodiment of the present invention.

in the step S106, the output signal of the second temperature sensor 14 is read in the electrical controlling unit 4 and is stored in a proper memory area thereof.

Then, temperature difference between the post-pressurization release temperature Ts2 and the pre-pressurization temperature Ts1 is calculated (refer to step S108 in FIG. 2).

In other words, temperature difference, dT=Ts2~Ts1, is obtained by subtracting the pre-pressurization temperature Ts1 from the post-pressurization release temperature Ts2. In addition, temperature difference dT described in the above is referred to as "actual measurement temperature difference dT" for convenience of description in the following description.

Then, determination is performed whether or not the absolute value of the difference between the representative temperature difference dt and the actual measurement temperature difference dT described in the above exceeds the threshold temperature difference Tdth (refer to step S110 in FIG. 2).

In this way, the reason why the determination is performed whether or not the absolute value of difference between the representative temperature difference dt and the actual measurement temperature difference dT exceeds the threshold temperature difference Tdth, is based on the result of experiments and researches performed assiduously by the inventor on the relationship between the absolute value of difference between the representative temperature difference dt and the actual measurement temperature difference dT, and the failure of the pressure sensor 11.

That is, the process in step S110 is based on the rule that is found through the result of experiments and researches performed assiduously by the inventor, in which the absolute value of the difference between the representative temperature difference dt and the actual measurement temperature difference dT remains within the range of the threshold temperature difference Tdth when the pressure sensor 11 is not failed and rail pressure control is performed normally.

Here, the representative temperature difference dt is the standard value of temperature difference between the post-pressurization release temperature Ts2 and the pre-pressurization temperature Ts1, that is predetermined based on the result of experiments and simulations.

It is assumed that an apparatus for performing a pressure sensor diagnosing process shown in FIG. 2, is used with a fixed rail pressure and a fixed engine speed, like a power facility described in the above. Therefore, if the operation condition and so on of the apparatus is determined, temperature difference between the post-pressurization release temperature Ts2 and the pre-pressurization temperature Ts1 is set to a certain value, and this value is the representative temperature difference dt and stored in advance in a proper memory area of the electrical controlling unit 4.

In addition, with respect to the threshold temperature difference Tdth, an appropriate value in accordance with the kind, the specific configuration of an apparatus or the like has to be determined based on the result of experiments, simulations, or the like.

Thus, in step S110, if it is determined that the absolute value of the difference between the representative temperature difference dt and the actual measurement temperature difference dT exceeds the threshold temperature difference Tdth (in a case of YES), it is determined that the pressure sensor 11 is failed (not normal) (refer to step S112 in FIG. 2), and the process returns to a main routine (not shown). Also, in the main routine, control process and so on that are made in advance to cope with the failure, is performed based on the determination result that the pressure sensor 11 is failed (refer to step S112 in FIG. 2).

On the other hand, in step S110, if it is determined that the absolute value of difference between the representative temperature difference dt and the actual measurement temperature difference dT does not exceed the threshold temperature difference Tdth (in a case of NO), it is determined that the pressure sensor 11 is normal (refer to step S114 in FIG. 2), and the process returns to the main routine (not shown) once.

Next, a first configuration example of a pressure sensor diagnosing process sequence will be described referring to FIG. 3, which is adequate for a case where the common rail fuel injection control apparatus is used in a so-called on-highway automobile.

Figure 3:
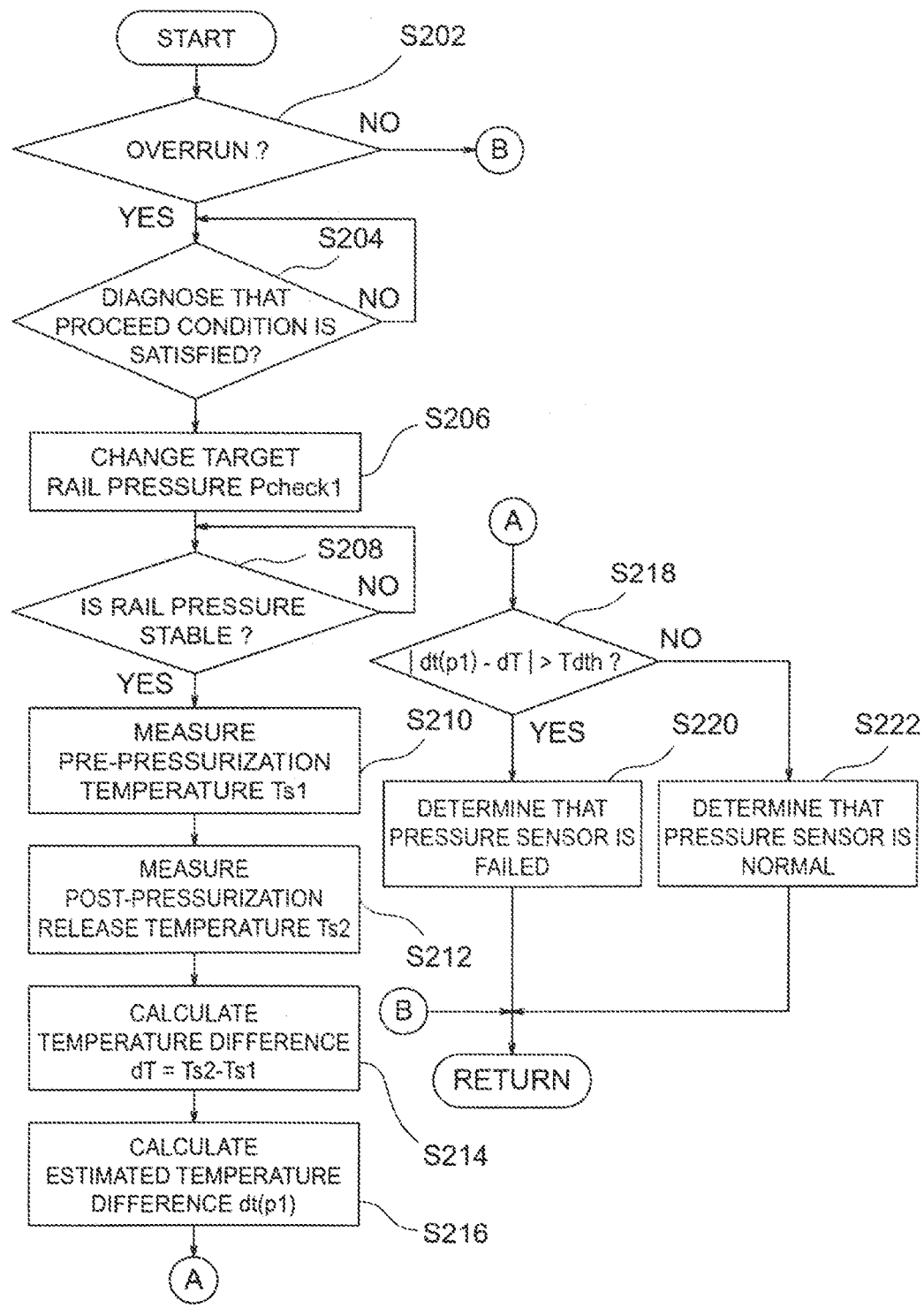
FIG. 3 is a subroutine flowchart illustrating a first half of the process sequence in a second configuration example of a pressure sensor diagnosing method in an embodiment of the invention.

First, if the process by the electrical controlling unit 4 is started, determination is performed whether or not the vehicle is in overrun state (refer to step S202 in FIG. 3).

That is, when the operation state of the engine 3 is in anon injection state, determination whether or not an accelerator pedal position is 0 is performed and then it is determined that the automobile is in overrun state (in a case of YES), the process proceeds to the process in step S204 that will be described below. On the other hand, when it is determined that the automobile is not in overrun state (in a case of NO), the process returns to the main routine (not shown) once.

Then, determination is performed whether or not the condition on which the process can proceed to the pressure sensor diagnosing process after step S206 is satisfied (refer to step S204 in FIG. 3).

Here, in an overrun state, as well as this consecutive pressure sensor diagnosing process, another various processes are performed. Therefore, on the purpose of preventing competition state where the pressure sensor diagnosing process competes with these other processes from occurring, determination is performed whether or not the condition on which the process can proceed is satisfied. Here, as these other processes, for example, there is a fine injection amount learning process and so on.

In vehicles in the embodiment of the present invention, as the details will be described below, it is assumed that the fine injection amount learning process is performed as one of the various control processes performed in an overrun state.

This fine injection amount learning process has to amend the deviation of the fuel injection amount from the original fuel injection amount, due to deterioration, failure, and the like in the fuel injection valves 2-1 to 2-n, in particular, in the pilot injection. In other words, if briefly described, in the fine injection amount learning process, at first, fine fuel injection is performed in an overrun state, based on the frequency components of the change in the engine speed occurred in that time, the estimated value of fuel amount that may be considered to be injected practically (estimated injection amount) is calculated.

In addition, difference $\Delta ET$ between electricity conduction time ET needed for obtaining an estimated injection amount and standard electricity conduction time is obtained as differential electricity conduction time learning value, and is stored in an electricity conduction time learning value map. Here, the standard electricity conduction time is the electricity conduction time when the use of fuel injection valves 2-1 to 2-n is started, and an electricity conduction time corresponding to the rail pressure and the fuel injection amount is mapped and is stored in advance in the electrical controlling unit 4.

After the differential electricity conduction time learning value $\Delta ET$ is obtained in this way, the time obtained by amending the standard electricity conduction time with the differential electricity conduction time learning value $\Delta ET$ is used as an electricity conduction time, thereby deviation between the fuel injection amount and the electricity conduction time can be amended.

Thus, in step S204, if it is determined that the condition capable of proceeding to the pressure sensor diagnosing process is satisfied (in a case of YES), change in the target rail pressure is performed, for example, the rail pressure is changed to a first target rail pressure Pcheck1.

Here, though change in the target rail pressure may be performed alone during this pressure sensor diagnosing process, it is preferable that setting of the target rail pressure that is performed in the fine injection amount learning process described in the above may be used. That is, it is preferable that determination be performed whether or not the rail pressure is stable (refer to step S208 in FIG. 3) when it is determined that the target rail pressure is changed in the fine injection amount learning process. The fine injection amount learning process and the pressure sensor diagnosing process are performed respectively in a so-called time sharing manner, thereby it is possible to prevent inconvenience from occurring due to competition of the processes.

In the determination in step S208 whether or not the rail pressure is stable, specifically, it is determined whether or not the actual rail pressure is in a stable state on the predetermined condition in the target rail pressure set in the step S206.

Here, with respect to the predetermined condition, it is preferable that various conditions be set according to the size of an apparatus and so on. However, for instance, the time to be in stable state may be the predetermined condition. In addition, as another condition, for instance, it is preferable that the actual rail pressure remain for a predetermined time or more within a predetermined deviation range from a target rail pressure as a center. In this case, the predetermined deviation range and the predetermined time have to be determined based on the results of experiments, simulations, and so on in view of various actual conditions for each apparatus.

In addition, it is not necessary that judgment criteria are limited to the above judgment criteria. More appropriate judgment criteria may be set in view of various actual conditions for each apparatus.

If it is determined that the rail pressure is stable in the step S208 (in a case of YES), measurement of pre-pressurization temperature Ts1 is performed (refer to step S210 in 3). That is, the output signal of the first temperature sensor 13 is read in the electrical controlling unit 4 and is stored in a proper memory area thereof.

The pre-pressurization temperature is as described in the above in the step S104 in FIG. 2, and thus the detail description thereof will be omitted here.

Then, measurement of post-pressurization release temperature Ts2 is performed (refer to step S212 in FIG. 3). That is the output signal of the second temperature sensor 14 is read in the electrical controlling unit 4 and is stored in a proper memory area thereof.

The post-pressurization release temperature is as described before in the step S106 in FIG. 2, and thus the detail description thereof will be omitted here.

Next, temperature difference between the post-pressurization release temperature Ts2 and the pre-pressurization temperature Ts1 is calculated (refer to step S214 in FIG. 3).

In other words, actual measurement temperature difference, dT=Ts2~Ts1, is obtained by subtracting the pre-pressurization temperature Ts1 from the post-pressurization release temperature Ts2.

Next, calculation of the estimated temperature difference dt(p1) is performed (refer to step S216 in FIG. 3).

That is, under the target rail pressure set in advance (refer to step S206 in FIG. 3), the temperature difference to be estimated between the post-pressurization release temperature Ts2 and the pre-pressurization temperature Ts1 (the estimated temperature difference) is calculated using the estimated temperature difference operation formula. Here, the estimated temperature difference operation formula is set based on the result of experiments, simulations, and the like.

Then, determination is performed whether or not the absolute value of difference between the estimated temperature difference dt(p1) and the actual measurement temperature difference dT exceeds the threshold temperature difference Tdth (refer to step S218 in FIG. 3).

Here, with respect to the threshold temperature difference Tdth, an appropriate value in accordance with the kind, the specific configuration of an apparatus or the like has to be determined based on the result of experiments, simulations, or the like.

In step S218, if it is determined that the absolute value of the difference between the estimated temperature difference dt(p1) and the actual measurement temperature difference dT exceeds the threshold temperature difference Tdth (in a case of YES), it is determined that the pressure sensor 11 is failed (not normal) (refer to step S220 in FIG. 3), and the process returns to the main routine (not shown). In addition, in the main routine, predetermined control process and so on to cope with the failure is performed, based on the determination result that the pressure sensor 11 is failed (refer to step S220 in FIG. 3).

On the other hand, in step S218, if it is determined that the above absolute value of the difference does not exceed the threshold temperature difference Tdth (in a case of NO), it is determined that the pressure sensor 11 is normal (refer to step S222 in FIG. 3), and process returns to the main routine (not shown) once.

In the above embodiment, the target rail pressure is changed only one time, and a pre-pressurization temperature Ts1 and a post-pressurization release temperature Ts2 corresponding to the change are measured respectively, thereby failure diagnosing is performed based on the measurement result. However, it is not necessary to limit the number of time of the change in the target rail pressure only to one time, but rather the number of time of the change may be set to a plurality of times. Each time the target rail pressure is changed, a pre-pressurization temperature Ts1 and a post-pressurization release temperature Ts2 may be measured respectively.

Figure 4:
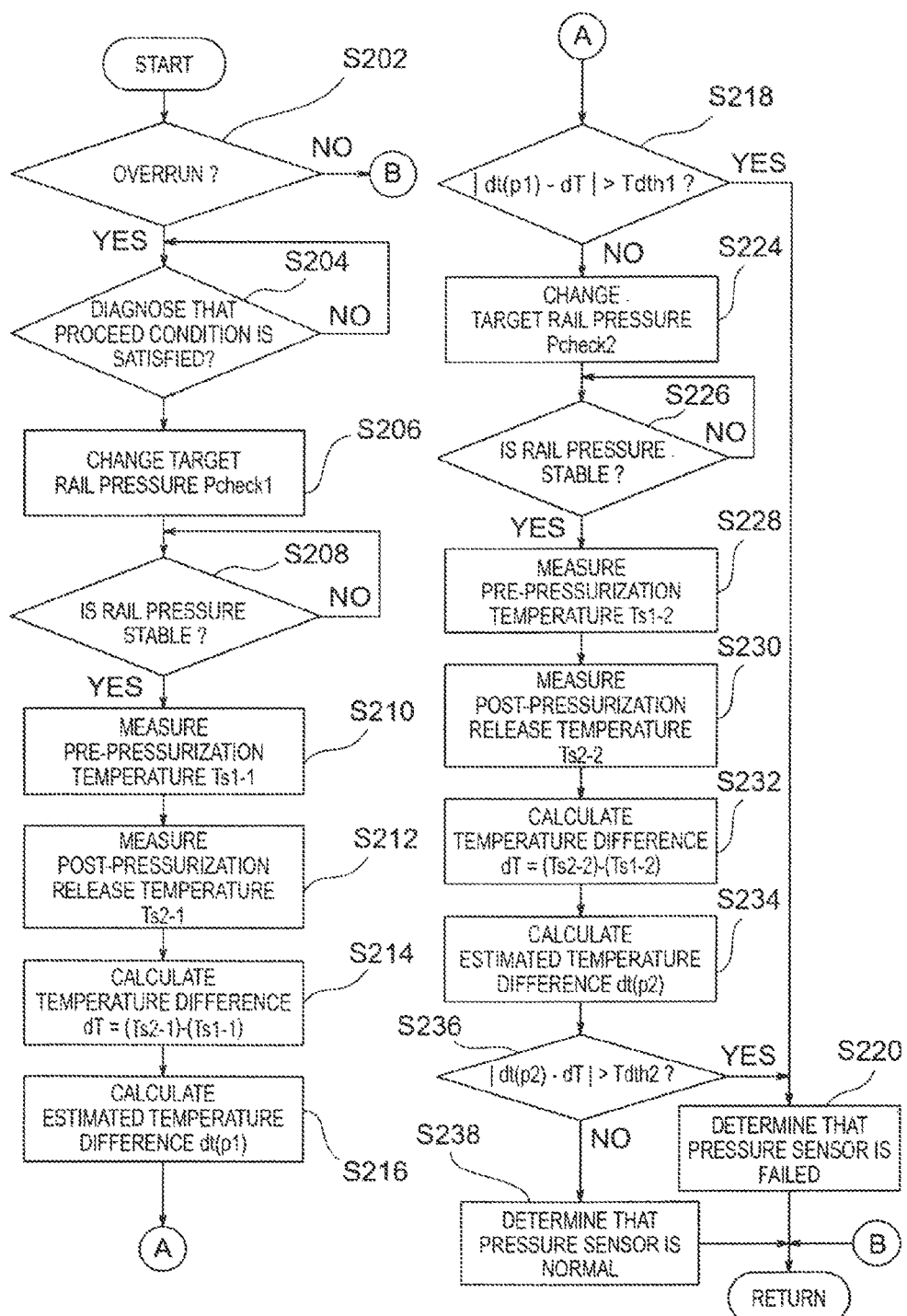
FIG. 4 is a subroutine flowchart illustrating a second half part of the process sequence of a second configuration example of a pressure sensor diagnosing method in an embodiment of the invention.

In FIG. 4, a process sequence in a case where the target rail pressure is changed two times. Hereinafter, the process sequence in this case will be described with reference to FIG. 4.

Also, with respect to steps in which the same process contents as those in the flowchart shown in FIG. 3 are implemented, the same step numbers are attached, and thus the detail description will be omitted. Instead of this, hereinafter, description will be concentrated on the different steps from those in FIG. 3.

If the process by the electrical controlling unit 4 is started, determination is performed whether or not the vehicle is in overrun state (refer to step S202 in FIG. 4). From this step to step S218, basically the same process as that described in the above refer FIG. 3 is performed.

In addition, in the process example shown in FIG. 4, under the target rail pressure Pcheck1, a pre-pressurization temperature is referred to as Ts1-1 and a post-pressurization release temperature is referred to as Ts2-1. Also, under the target rail pressure Pcheck2, a pre-pressurization temperature is referred to as Ts1-2 and a post-pressurization release temperature is referred to as Ts2-2.

Thus, in step S218, if it is determined that the absolute value of the difference between the estimated temperature difference dt(p1) and the actual measurement temperature difference dT exceeds a first threshold temperature difference Tdth1 (in a case of YES), it is determined that the pressure sensor 11 is failed (not normal) (refer to step S220 in FIG. 4), and the process returns to a main routine (not shown).

On the other hand, in step S218, if it is determined that the absolute value of the difference does not exceed the first threshold temperature difference Tdth1 (in a case of NO), a second target rail pressure change is performed (refer to step S224 in FIG. 4). In addition, the target rail pressure in this case is referred to as Pcheck2 for convenience.

Also, with respect to the change in the target rail pressure, as described in the above in step S206 in FIG. 3, setting of the target rail pressure that is performed in the fine injection amount learning process may be used.

Next, it is determined whether or not the rail pressure is stable (refer to step S226 in FIG. 4). Also, judgment criteria whether or not the rail pressure is stable is the same as described in the above in step S208 in FIG. 3, the detail description thereof will be omitted here.

If it is determined that the rail pressure is stable in step S226 (in a case of YES), measurement of pre-pressurization temperature Ts1-2 is performed (refer to step S228 in FIG. 4). That is, the output signal of the first temperature sensor 13 is read in the electrical controlling unit 4 and is stored in a proper memory area thereof.

Next, measurement of post-pressurization release temperature Ts2-2 is performed (refer to step S230 in FIG. 4). That is, the output signal of the second temperature sensor 14 is read in the electrical controlling unit 4 and is stored in a proper memory area thereof.

Then, actual measurement temperature difference that is temperature difference between the post-pressurization release temperature Ts2-2 and the pre-pressurization temperature Ts1-2 is calculated (refer to step S232 in FIG. 4).

Next, calculation of the estimated temperature difference dt(p2) is performed (refer to step S234 in FIG. 4).

That is, under the target rail pressure Pcheck2 set in step S224, the temperature difference to be estimated between the post-pressurization release temperature Ts2-2 and the pre-pressurization temperature Ts1-2 (the estimated temperature difference) is calculated using the estimated temperature difference operation formula. Here, the estimated temperature difference operation formula is set based on the result of experiments, simulations, and the like.

Next, determination is performed whether or not the absolute value of the difference between the estimated temperature difference dt(p2) and the actual measurement temperature difference dT exceeds a second threshold temperature difference Tdth2 (refer to step S236 in FIG. 4).

In step S236, if it is determined that the absolute value of the difference between the estimated temperature difference dt(p2) and the actual measurement temperature difference dT exceeds a second threshold temperature difference Tdth2 (in a case of YES), the process proceeds to the process in step S220 described in the above. On the other hand, if it is determined that the absolute value of difference between the estimated temperature difference dt(p2) and the actual measurement temperature difference dT does not exceed the second threshold temperature difference Tdth2 (in a case of NO), it is determined that the pressure sensor 11 is normal (refer to step S238 in FIG. 4), and the process returns to the main routine (not shown) once.

In the above described embodiment, a case where the target rail pressure is changed two times is exemplified, but, usually, the number of time of the change in the target rail pressure is not limited, the number of time of the change may be set to a plurality of times.

The present invention is suitable for a common rail fuel injection control apparatus in which more simple diagnosis using a pressure sensor that detects a rail pressure is desired.

According to the present invention, an effect capable of diagnosing a failure of a pressure sensor with simple configuration is exhibited by newly providing only one cheap temperature sensor to detect post-pressurization release temperature of fuel, regardless of presence or absence of the safety valve in a common rail.

What is claimed is:

1. A pressure sensor diagnosing method of a common rail fuel injection control apparatus in which fuel in a fuel tank is pressurized and pressure-fed into a common rail by a high pressure pump, high pressure fuel is injected into an internal combustion engine through an injector connected to the common rail, and a pressure of the common rail is controlled based on a detection signal of a pressure sensor that detects the pressure of the common rail, the pressure sensor diagnosing method comprising: obtaining an actual measurement temperature difference which is a difference between a pre-pressurization temperature of the fuel and a post-pressurization release temperature of the fuel, when a target rail pressure is changed; calculating an estimated temperature difference using a predetermined calculation formula, the estimated temperature difference being a difference between a pre-pressurization temperature of the fuel and a post-pressurization release temperature of the fuel which is estimated to be obtained by a change in the target rail pressure; and determining that the pressure sensor is failed when an absolute value of a difference between the estimated temperature difference and the actual measurement temperature difference exceeds a predetermined threshold value.

2. The pressure sensor diagnosing method according to claim 1, wherein the target rail pressure is changed a plurality of times; wherein determination is performed respectively whether or not the absolute value of the difference between the estimated temperature difference and the actual measurement temperature difference exceeds the predetermined threshold value each time the target rail pressure is changed; and wherein it is determined that the pressure sensor is failed when the absolute value exceeds the predetermined threshold value.

3. A common rail fuel injection control apparatus in which fuel in a fuel tank is pressurized and pressure-fed into a common rail by a high pressure pump, high pressure fuel is injected into an internal combustion engine through an injector connected to the common rail, and a pressure of the common rail is controlled by an electrical controlling unit, based on a detection signal of a pressure sensor that detects the pressure of the common rail, wherein the electrical controlling unit is constructed to calculate an actual measurement temperature difference which is a difference between a pre-pressurization temperature of the fuel and a post-pressurization release temperature of the fuel when a target rail pressure of the common rail is changed, calculate an estimated temperature difference by a predetermined calculation formula, the estimated temperature difference being a difference between a pre-pressurization temperature of the fuel and a post-pressurization release temperature of the fuel which is estimated to be obtained by a change of the target rail pressure, determine whether an absolute value of a difference between the estimated temperature difference and the actual measurement temperature difference exceeds a predetermined threshold value, and determine that the pressure sensor is failed when the absolute value exceeds the predetermined threshold value.

4. The common rail fuel injection control apparatus according to claim 3, wherein the electrical controlling unit is constructed to cause the target rail pressure to be changed a plurality of times, perform determination respectively whether or not the absolute value of the difference between the estimated temperature difference and the actual measurement temperature difference exceeds the predetermined threshold value each time the target rail pressure is changed, and determine that the pressure sensor is failed when the absolute value exceeds the predetermined threshold value.

* * * * *